United States Patent
Peck et al.

(10) Patent No.: US 8,219,923 B2
(45) Date of Patent: *Jul. 10, 2012

(54) AUTOMATIC GENERATION OF DOCUMENTATION FOR SPECIFIED SYSTEMS

(75) Inventors: Joseph E. Peck, Hutto, TX (US); Damien F. Gray, Austin, TX (US)

(73) Assignee: National Instruments Corporation, Austin, TX (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/372,682

(22) Filed: Mar. 10, 2006

(65) Prior Publication Data

US 2007/0214427 A1 Sep. 13, 2007

(51) Int. Cl.
*G06F 3/048* (2006.01)
*G06F 3/00* (2006.01)
*G06F 7/60* (2006.01)
*G06F 9/44* (2006.01)
*G06F 15/00* (2006.01)
*G01D 1/00* (2006.01)
*G06M 11/04* (2006.01)
*G01R 27/28* (2006.01)
*G01R 31/00* (2006.01)
*G01R 31/14* (2006.01)
*H04L 12/66* (2006.01)

(52) U.S. Cl. ........ 715/771; 370/463; 702/119; 702/123; 702/127; 703/2; 715/762; 715/763; 715/764; 717/109

(58) Field of Classification Search .............. 715/771, 715/764; 702/127; 703/2; 370/463
See application file for complete search history.

(56) References Cited

U.S. PATENT DOCUMENTS

| | | | |
|---|---|---|---|
| 4,914,568 | A | 4/1990 | Kodosky et al. |
| 5,452,206 | A | 9/1995 | Turrietta et al. |
| 5,825,356 | A | 10/1998 | Habib et al. |
| 5,918,233 | A | 6/1999 | La Chance et al. |
| 5,953,526 | A | 9/1999 | Day et al. |
| 5,974,257 | A | 10/1999 | Austin |
| 6,219,628 | B1 | 4/2001 | Kodosky et al. |

(Continued)

OTHER PUBLICATIONS

Microsoft Office Word Version 11.8134.8132, copyright 1983-2003 by the Microsoft Corporation. See Files Wordopentext2.pdf and Wordopentext4.pdf for screenshots.*

(Continued)

*Primary Examiner* — Boris Pesin
*Assistant Examiner* — Elizabeth G Wright
(74) *Attorney, Agent, or Firm* — Meyertons Hood Kivlin Kowert & Goetzel, P.C.; Jeffrey C. Hood; Joel L. Stevens

(57) ABSTRACT

System and method for generating information regarding the functionality of a system. Input specifying at least a portion of functionality of a system may be received, e.g., from a user via a graphical user interface (GUI), and may specify one or more components of the system at a component level. The input may specify one or more components of the system, e.g., software component(s), hardware device(s), function(s) of the system, etc. Information, e.g., help information and/or documentation, describing one or more aspects of the functionality of the system may be automatically generated based on the input. The descriptions of the aspects may include information regarding the synergistic/combinatorial interactions of the components at a system level, e.g., via calculation or derivation from data retrieved from various sources regarding the components of the system. The information may be automatically stored and/or automatically displayed in the GUI substantially in real-time.

37 Claims, 11 Drawing Sheets

U.S. PATENT DOCUMENTS

| | | | |
|---|---|---|---|
| 6,389,481 | B1 | 5/2002 | Malcolm |
| 6,452,607 | B1 | 9/2002 | Livingston |
| 6,634,009 | B1 | 10/2003 | Molson et al. |
| 6,788,313 | B1 | 9/2004 | Heil |
| 6,799,198 | B1 | 9/2004 | Huboi et al. |
| 6,943,466 | B2 * | 9/2005 | Oohashi ............... 310/45 |
| 6,981,207 | B1 | 12/2005 | Bakman et al. |
| 6,993,466 | B2 * | 1/2006 | Kodosky et al. ........... 703/2 |
| 6,996,769 | B1 | 2/2006 | Peikes et al. |
| 7,016,062 | B2 * | 3/2006 | Ishizuka ............ 358/1.15 |
| 7,114,149 | B2 | 9/2006 | Aptus et al. |
| 7,162,387 | B2 * | 1/2007 | Johnson et al. ........ 702/123 |
| 7,188,336 | B2 | 3/2007 | Humphries |
| 7,200,838 | B2 | 4/2007 | Kodosky et al. |
| 7,210,117 | B2 | 4/2007 | Kudukoli et al. |
| 7,650,316 | B2 | 1/2010 | Peck et al. |
| 2002/0091993 | A1 | 7/2002 | Walley et al. |
| 2002/0144192 | A1 | 10/2002 | Owari |
| 2003/0229608 | A1 | 12/2003 | Reynar et al. |
| 2004/0006480 | A1 | 1/2004 | Ehlen et al. |
| 2004/0139073 | A1 | 7/2004 | Bauchot et al. |
| 2005/0144595 | A1 | 6/2005 | McLean et al. |
| 2005/0216891 | A1 | 9/2005 | Sundararajan et al. |
| 2006/0059423 | A1 | 3/2006 | Lehmann et al. |
| 2006/0079752 | A1 | 4/2006 | Anderl et al. |
| 2006/0150090 | A1 | 7/2006 | Swamidass et al. |
| 2006/0259861 | A1 | 11/2006 | Watson |
| 2006/0265232 | A1 | 11/2006 | Katariya et al. |
| 2006/0268926 | A1 * | 11/2006 | Zanaty ............... 370/463 |
| 2007/0214427 | A1 | 9/2007 | Peck et al. |
| 2007/0239628 | A1 | 10/2007 | Peck et al. |
| 2008/0263463 | A1 | 10/2008 | Neumann |
| 2008/0263512 | A1 | 10/2008 | Dellas et al. |

OTHER PUBLICATIONS

IBM, "Algorithm for a Documentation Publishing System Preprocessor", Nov. 1, 1992, vol. 35 Issue 6, Disclosure Text. TBD-ACC-No. NN9211201.*

Microsoft Notepad Version 5.1, copyright 1981-2001 by the Microsoft Corporation. See Files notepad.pdf, notepad1.pdf, and notepad2.pdf for screenshots.*

Microsoft Office Word Version 11.8134.8132, copyright 1983-2003 by the Microsoft Corporation. See Files Wordopentext1.pdf and Wordopentext2.pdf for screenshots.*

IBM "Algorithm for a Documentation Publishing System Preprocessor," Nov. 1, 1992, vol. 35 Issue 6, Disclosure Text. TBD-ACC-No. NN9211201.*

"Code Documentation Generator for .NET"; NDoc—.NET Code Documentation Generator; Retrieved from the Internet: http://ndoc.sourceforge.net/usersguide.html; Dec. 17, 2004; 1 page.

"What's new in NDoc 1.3?"; NDoc—.NET Code Documentation Generator; Retrieved from the Internet: http://ndoc.sourceforge.net/usersguide.html; Dec. 17, 2004; 7 page.

"Known Issues"; NDoc—.NET Code Documentation Generator; Retrieved from the Internet: http://ndoc.sourceforge.net/usersguide.html; Dec. 17, 2004; 2 page.

"Getting Started"; NDoc—.NET Code Documentation Generator; Retrieved from the Internet: http://ndoc.sourceforge.net/usersguide.html; Dec. 17, 2004; 2 page.

"Decorating Your Code"; NDoc—.NET Code Documentation Generator; Retrieved from the Internet: http://ndoc.sourceforge.net/usersguide.html; Dec. 17, 2004; 1 page.

"Tags Supported by NDoc"; NDoc—.NET Code Documentation Generator; Retrieved from the Internet: http://ndoc.sourceforge.net/usersguide.html; Dec. 17, 2004; 2 page.

"Attributes supported by NDoc"; NDoc—.NET Code Documentation Generator; Retrieved from the Internet: http://ndoc.sourceforge.net/usersguide.html; Dec. 17, 2004; 2 page.

"Creating an NDoc Project"; NDoc—.NET Code Documentation Generator; Retrieved from the Internet: http://ndoc.sourceforge.net/usersguide.html; Dec. 17, 2004; 2 page.

U.S. Appl. No. 60/913,028, entitled "Configuring and Debugging a Statechart", by Nicholas G. Neumann and Toga Hartadinata, filed Apr. 20, 2007.

Office Action from U.S. Appl. No. 11/373,392, entitled "Automatic Generation of Help Information for Specified Systems", by Joseph E. Peck and Damien F. Gray, dated Dec. 11, 2007. 19 pages.

Final Office Action from U.S. Appl. No. 11/373,392, entitled "Automatic Generation of Help Information for Specified Systems", by Joseph E. Peck and Damien F. Gray, dated Jun. 27, 2008. 15 pages.

Office Action from U.S. Appl. No. 11/373,392, entitled "Automatic Generation of Help Information for Specified Systems", by Joseph E. Peck and Damien F. Gray, dated Nov. 12, 2008. 15 pages.

Final Office Action from U.S. Appl. No. 11/373,392, entitled "Automatic Generation of Help Information for Specified Systems", by Joseph E. Peck and Damien F. Gray, dated Apr. 27, 2009. 7 pages.

* cited by examiner

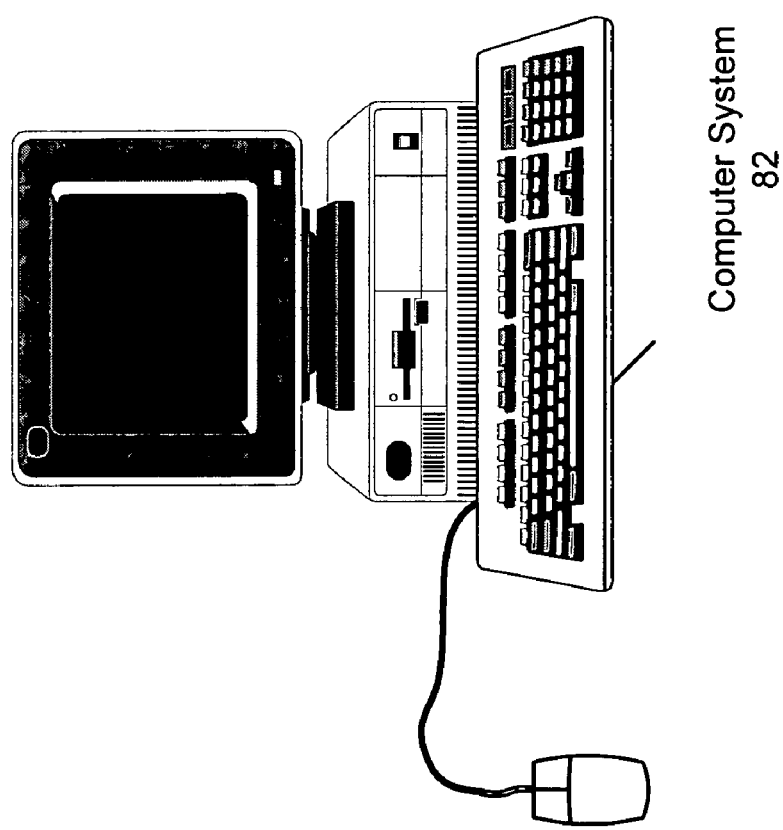

AUTOMATIC GENERATION OF DOCUMENTATION FOR SPECIFIED SYSTEMS

FIELD OF THE INVENTION

The present invention relates to the field of help information, and more particularly to a system and method for automatically generating help information for user defined functions.

DESCRIPTION OF THE RELATED ART

In recent years, scientists, engineers, technicians, and others have designed various systems for use in industry and by consumers. In many cases, the designs of these systems are generated via programs running on computer systems, e.g., graphical user interfaces (GUIs), wizards, etc., whereby the user designs or specifies functionality of the system via various displays, panels, etc. Sometimes these systems become complex enough that the designer may not realize the full ramifications of particular choices made for the system.

Additionally, after specifying the system, typically, only the designer fully understands the newly created system, and in many cases, the system must be manually documented so that other engineers or users can use or modify it. However, manual documentation of systems is often neglected, resulting in resources which may not be fully understand or utilized by the company or other users.

Alternatively, some prior methods simply generate documentation from pre-made sections corresponding to individual components of the system. For example, in one prior method, the documentation for a surround sound home theatre system may include pre-existing sections for each particular component of the system, e.g., the front, rear, center, and subwoofer speakers, the receiver, and the television. In another prior art approach, documentation for a system may be written generically, i.e., for a variety of systems in the same class. For example, one document may be written for all of a particular class of printers, so that when a new printer in that class needs to be documented, the generic document may be supplied. However, such methods do not provide adequate descriptions of all of the individual components as well as the synergistic/combinatorial qualities of the system with regard to its components.

Thus, improved systems and methods for design and documentation of systems are desirable.

SUMMARY OF THE INVENTION

Various embodiments of a system and method are described for automatically generating help information and/or documentation based on received input.

In some embodiments, user input may be received to a graphical user interface (GUI) specifying at least a portion of functionality of a system. The input may be received via various methods, e.g., via a keyboard or mouse coupled to a computer system executing the GUI, or a another computer system coupled to the computer system, among others, via voice recognition software, e.g., via a microphone, and/or other methods for user input.

In one embodiment, the user input may specify various types of functionalities, e.g., measurement, automation, control, and/or testing functionality. For example, the user may specify a portion of functionality of a simple system that includes a software routine and associated digitizer board for acquiring and manipulating analog data. Note that the above listed functionalities are exemplary only, and in fact, other applications are envisioned, such as, for example, specification of industrial and/or measurement functions, specification of attributes of the functionality of the system, and specification of various other systems and appliances, e.g., consumer electronics, home appliances, computer systems, sound systems, printers, and others. In some embodiments, the user input may specify functionality and/or behavior of a plurality of components, e.g., software component(s), local and/or remote hardware component(s), e.g., device(s), etc., for performing at least the portion of the functionality of the system, e.g., at a component level. In one embodiment the software components may include one or more graphical program(s) and/or text-based program(s). The hardware device(s) may include one or more pluggable module(s) insertable into a chassis, and/or device(s), e.g., measurement device(s), automation device(s), testing device(s), simulation device(s), consumer electronic device(s), e.g., in a home appliance or consumer electronic system, and/or other suitable device(s). As an example, the user may specify a portion of functionality of a complex system, e.g., a motion control system, which may include several analog and digital I/O modules, an FPGA with associated code to drive the modules, and/or a controller with associated software to control the FPGA.

In some embodiments, the GUI may be or include a wizard, where, for example, the user may be led through specification of a system. In one embodiment, the wizard may receive user input via a series of input windows, e.g., in the GUI, which may allow the user to specify portions of functionality of the system in a logical manner, e.g., from lower-level functionality to higher-level functionality.

In some embodiments, help information describing one or more aspects of the functionality of the system may be automatically generated based on the user input. At least one of the one or more aspects of the functionality of the system may be at a system level, e.g., the help information may describe higher-level attributes of the system rather than just information that is specific to the portion of functionality specified by the user, e.g., components, functions, etc. For example, the user may specify a series of data acquisition boards in a system that are interdependent, that is, they must interact with each other for data acquisition. In such an example, the system may provide system information regarding the maximum working rate for the entire system based on the slowest data acquisition board of the series. Thus, the system may provide higher-level information, e.g., the maximum rate of acquisition for the system, rather than component-level information, e.g., rates associated with each of data acquisition boards. Further examples of these system level aspects will be described in more detail below.

In some embodiments, if the user has specified a plurality of components, automatically generating the help information may include retrieving information regarding the plurality of components and subsequently generating the help information based on that retrieved information. In one embodiment, the information may be retrieved from one or more digital files, e.g., eXtensible Markup Language (XML) files, which may include information regarding multiple components, a subset of which may be the plurality of components. In other words, the digital files may include information regarding a plethora of components, some or all of which may be the specified plurality of components. Alternatively, or additionally, the information may be similarly retrieved from one or more databases. In one embodiment, the databases may include information regarding a plurality of devices, and as with the components, a subset of these may be the one or more devices specified by the user. The databases and/or digital files may be organized in a hierarchical structure, e.g., there may be a master database and/or digital file which may indicate one or more other databases and/or digital files which may include information regarding classes of devices and/or components. These databases, and/or digital files, may in turn indicate other database(s) or digital file(s), or may contain the information regarding the component(s) and/or device(s) specified by the user. Note that the above-described organization is exemplary only, and that other organizations are envisioned.

In some embodiments, retrieving the information may also include polling, i.e., querying, one or more attached hardware devices, such as those devices described above, among others. In one embodiment, the attached hardware devices may be simulated, e.g., the GUI may emulate their presence using virtual devices. In this case, polling the hardware devices may include polling the virtual devices for information, which may return information using similar methods as those described above.

In some embodiments, automatically generating the help information may include synthesizing or calculating one or more system level attributes of the system based on the information regarding the plurality of components and/or the user input. More specifically, when the user specifies one or more functions (e.g., industrial, measurement, automation, etc.), components (e.g., software components and/or hardware devices), and/or other attributes of the functionality of the system, the help information may include information regarding the combination of and/or the interaction between one or more of the specified attributes, functions, and/or components, among others.

The help information may be automatically displayed in the GUI substantially in real time. In some embodiments, the help information may be displayed in a window of the GUI as text. Alternatively, or additionally, the help information may be graphical, e.g., the help information may include a graphical depiction of at least a subset of the system displayed in one or more windows of the GUI.

In some embodiments, the method may also include receiving further user input specifying modification and/or addition of a portion of functionality of the system. Similar to above, the modification and/or addition may be performed via various techniques, e.g., by entering (or re-entering) input specifying the modification and/or addition, e.g., via a keyboard, or by addition to and/or modification of the depictions of the system, e.g., by graphically editing the pictorial help information, e.g., via dragging and dropping with a mouse. Subsequently, similar to above, the help information may be automatically updated and displayed based on the new user input. Moreover, performing said receiving user input, automatically generating/updating help information, and automatically displaying the help information one or more times may specify the functionality of the system.

In some embodiments, input specifying functionality of a system may be received. The functionality may be specified via the iterative method described above. For example, portions of functionality may be specified by the user via multiple windows, e.g., via a wizard included in the GUI, resulting in input specifying the full functionality of the system. Alternatively, or additionally, the input may include other user input and/or digital file(s), among others. In one embodiment, the input may include generated code for controlling/executing the designed system. For example, the generated code may have already been generated for use in a pre-existing system; alternatively, the generated code may be created by another system used for implementing designs in systems. In one embodiment, the generated code may include one or more text-based and/or graphical programs which may be stored in the memory medium of a computer system. The code may be stored in the memory medium of another computer system coupled to the computer system, or in some external device coupled to the computer system.

Similar to above, the input may specify a variety of functions, desired behavior, desired functionality, e.g., industrial, measurement, testing, automation, control, etc., components, e.g., hardware devices and software components, e.g., text-based and/or graphical program(s), and other systems, e.g., home theatre systems, consumer electronic systems, etc., among others. As also described above, the input may specify functionality of the system at a component-level, e.g., with regard to how individual components, or subsets of the functionality, of the system operate.

Documentation describing aspects of the functionality of the system may be automatically generated based on the input. In one embodiment, input in the form of digital files, may be automatically analyzed to generate the documentation. For example, generated code, e.g., for controlling a motion system, may be automatically analyzed, and subsequently, may be documented according to that analysis. More specifically, the generated code may be analyzed for component level aspects, e.g., specific functions and functionalities, components, attached devices, etc., as well as other aspects, e.g., system level aspects, user defined aspects, and other suitable aspects. Subsequently, the information garnered from the analysis may be used to automatically generate the documentation. Alternatively, or additionally, when the input is received via the methods described above, a subset or all of the automatically generated help information, and possibly other information, may be compiled into the documentation.

Similar to above, in some embodiments, information regarding the specified components, attributes, functionalities, etc., may be retrieved from various sources, e.g., one or more digital files, e.g., XML or Electronic Data Sheet (EDS) files, one or more databases with various organizational structures, one or more devices, and/or one or more virtual devices, e.g., for the devices and virtual devices, via polling, among others. Thus, in generating the documentation, the retrieved information, and/or other attributes that are specified by the input, may be used to synthesize or calculate system-level attributes, which may describe high-level aspects of the system, e.g., caused by or related to the interaction between or the combination of the various specified components, functionality, etc.

The documentation may be automatically stored. In some embodiments, the input or further input may specify storage of the documentation in one or more file formats, e.g., one or more generic formats which may be later converted to any of a plurality of specific formats. The one or more file formats may include one or more of extensible Markup Language (XML) format, Hyper Text Markup Language (HTML) format, portable document format (pdf), Microsoft Word document format, plain text format, OpenDocument Format (ODF), American Standard Code for Information Interchange (ASCII) format, post script (ps) format, a compression format, a graphical format, and an executable format, among others.

As indicated above, if the documentation is encoded in one or more generic formats, e.g., XML, the method may also include converting the documentation to at least one of the one or more specific formats, e.g., from the file formats listed above, among others. In one embodiment, the user may choose among a variety of destination file format(s), e.g., via the GUI, e.g., via a menu included in the GUI and may invoke the automatic conversion of the documentation. Furthermore, similar to descriptions above, the method may further include receiving input, e.g., user input, modifying at least a portion of functionality of the system. In one embodiment, the method may automatically update the documentation according to the user input and subsequently automatically store the documentation similar to above, e.g., in one or more file formats, e.g., according to the input or further input.

In some embodiments, the method may also include transmitting the documentation to another memory medium, e.g., to a memory medium included in another computer system coupled to the computer system, and/or other computer system(s) or device(s). Alternatively, or additionally, the documentation may be printed and/or published, e.g., on a network, e.g., the Internet, for access by various users who may require the documentation.

BRIEF DESCRIPTION OF THE DRAWINGS

A better understanding of the present invention can be obtained when the following detailed description of the preferred embodiment is considered in conjunction with the following drawings, in which:

FIG. 1A illustrates a computer system, according to one embodiment of the present invention;

Figure 1B:
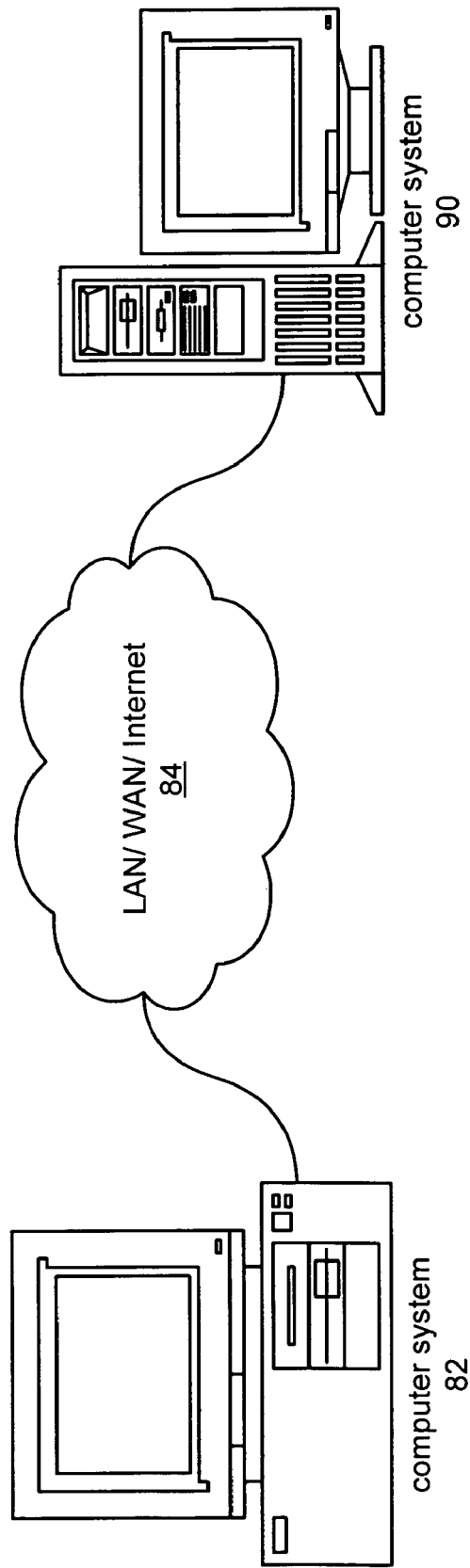
FIG. 1B illustrates a network system comprising two or more computer systems that may implement one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 6,965,800 titled "A System of Measurements Experts and Method for Generating High-Performance Measurements Software Drivers," filed Nov. 13, 2001.

U.S. patent application Ser. No. 10/128,843 titled "Measurement System Graphical User Interface for Easily Configuring Measurement Applications," filed Apr. 21, 2002.

U.S. patent application Ser. No. 10/839,862 titled "Application Domain Specific Graphical User Interface for Specification and Programmatic Generation of Graphical Programs," filed May 6, 2004.

U.S. patent application Ser. No. 11/349,465 titled "Automatic Generation of Application Domain Specific Graphical Programs," filed Feb. 7, 2006, now U.S. Pat. No. 7,836,426.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LABVIEW™, DASYLAB™, DIADEM™ and MATRIXX/SYSTEMBUILD™ from National Instruments, SIMULINK™ from the MathWorks, VEE™ from Agilent, WIT™ from Coreco, VISION PROGRAM MANAGER™ from PPT Vision, SOFTWIRE™ from Measurement Computing, SANSCRIPT™ from Northwoods Software, KHOROS™ from Khoral Research, SNAPMASTER™ from HEM Data, VISSIM™ from Visual Solutions, OBJECTBENCH™ by SES (Scientific and Engineering Software), and VISIDAQ™ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82, according to one embodiment of the present invention.

As shown in FIG. 1A, the computer system 82 may include a display device operable to display a program which may implement various embodiments of the present invention. The display device may also be operable to display a graphical user interface or front panel of the program during execution of the program. The graphical user interface may comprise any type of graphical user interface, e.g., depending on the computing platform.

The computer system 82 may include a memory medium(s) on which one or more computer programs or software components, according to one embodiment of the present invention, may be stored. For example, the memory medium may store one or more programs that are executable to perform the methods described herein. Additionally, the memory medium may store a programming development environment application, e.g., a graphical programming development environment application used to create and/or execute graphical programs. The memory medium may also store operating system software, as well as other software for operation of the computer system. Various embodiments further include receiving or storing instructions and/or data implemented in accordance with the foregoing description upon a carrier medium.

FIG. 1B—Computer Network

FIG. 1B illustrates a system including a first computer system 82 which is coupled to a second computer system 90. The computer system 82 may be coupled via a network 84 (or a computer bus) to the second computer system 90. The computer systems 82 and 90 may each be any of various types, as desired. The network 84 may also be any of various types, including a LAN (local area network), WAN (wide area network), the Internet, or an Intranet, among others.

In some embodiments, the computer systems 82 and 90 may execute a program in a distributed fashion. For example, computer 82 may display the graphical user interface of a program and computer system 90 may execute another portion of the program.

In one embodiment, the graphical user interface of the program may be displayed on a display device of the computer system 82, and the other portion may execute on a device, coupled to the computer system 82. The device may include a programmable hardware element and/or may include a processor and memory medium which may execute a real time operating system. In one embodiment, the program may be downloaded and executed on the device.

Exemplary Systems

Embodiments of the present invention may relate to specification and documentation for test and/or measurement systems, controlling and/or modeling instrumentation or industrial automation systems, modeling and simulation systems, and other systems, e.g., modeling or simulating systems for developing or testing a device or product, home automation systems, consumer electronics and/or consumer systems, e.g., printers, sound systems, recording equipment, and home appliances, among others, etc.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used for any of various types of applications, including the design and/or documentation of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
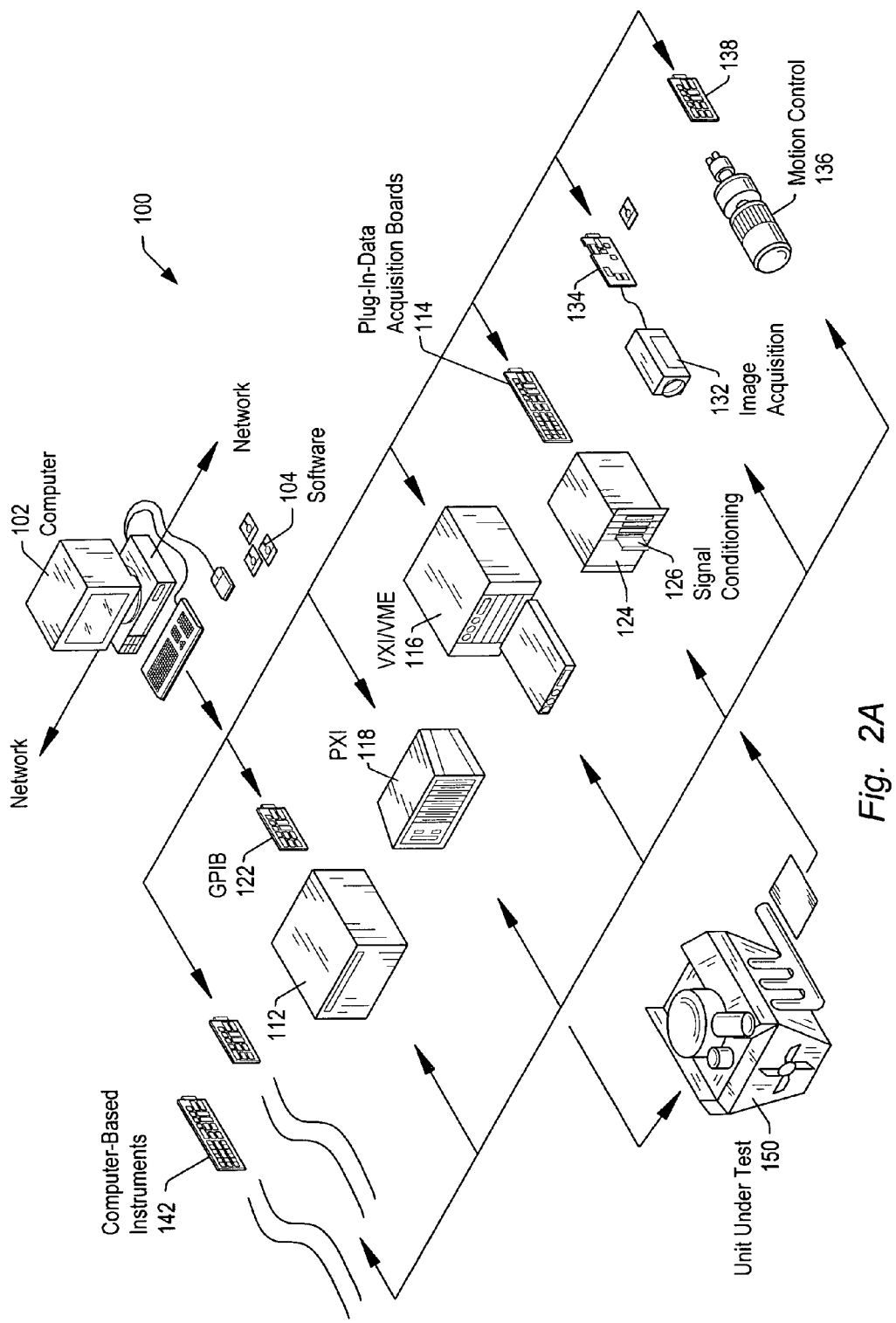
FIG. 2A illustrates an instrumentation control system, according to one embodiment of the invention.
Figure 2B:
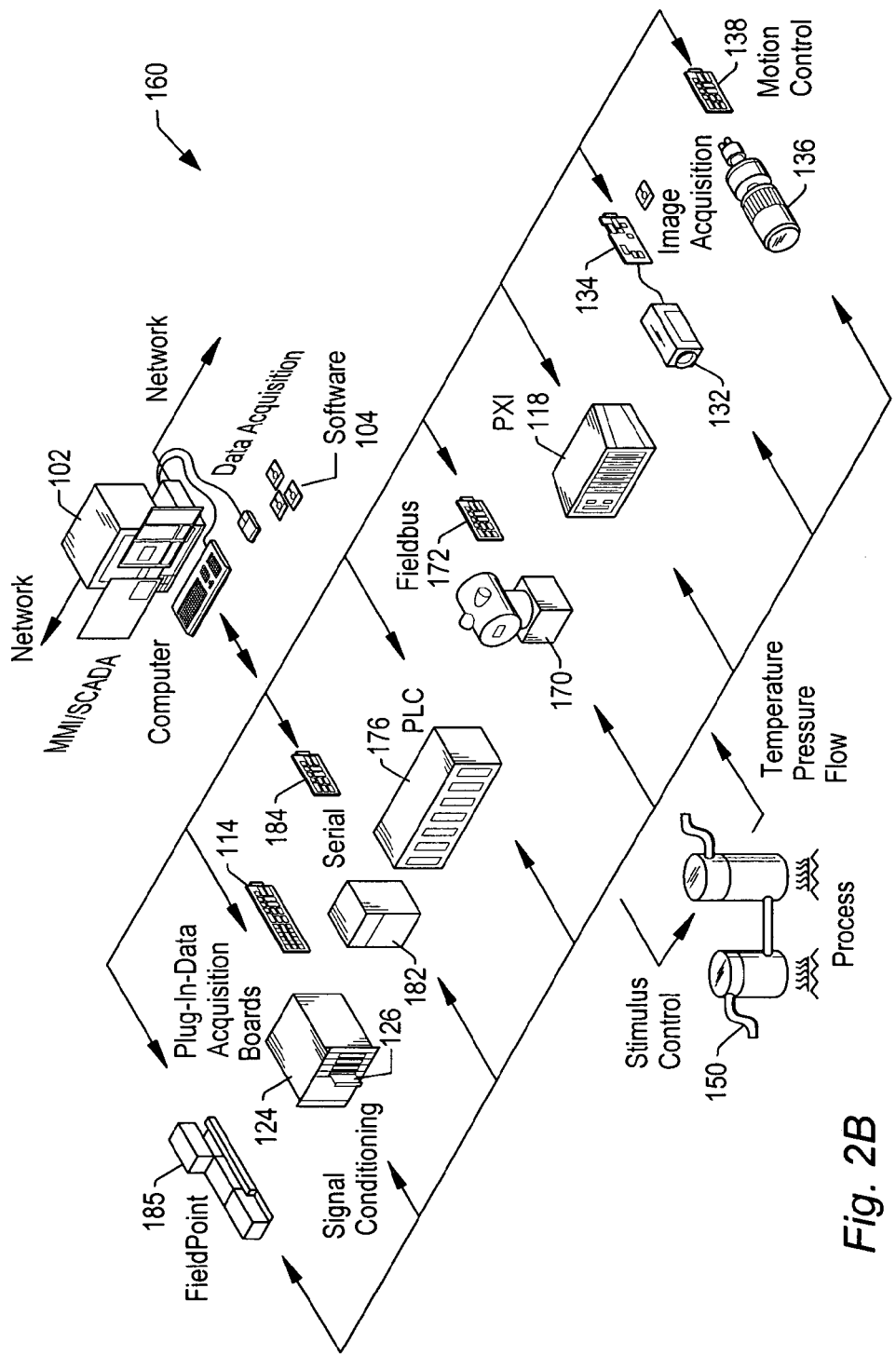
FIG. 2B illustrates an automation system, according to one embodiment of the invention.

FIGS. 2A and 2B—Instrumentation and Industrial Automation Systems

FIGS. 2A and 2B illustrate exemplary measurement and automation systems. As used herein, the term "measurement system" is intended to include the types of measurement systems and automation systems shown in FIGS. 2A and 2B, as well as other types of systems. The measurement system shown in FIGS. 2A and 2B may include software programs according to one embodiment of the present invention. These programs may be stored in or used by other types of systems as desired. In accordance with one embodiment of the present invention, the present system and method includes a novel software architecture and novel software programs for allowing users to more easily specify and/or document various tasks, e.g., measurement and automation tasks (collectively referred to as "measurement tasks").

As used herein, the term "measurement system" is intended to include an instrumentation system such as that shown in FIG. 2A, an industrial automation system such as that shown in FIG. 2B, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation.

FIG. 2A illustrates an exemplary instrumentation control system 100 which may be specified and/or documented according to various embodiments of the present invention. The system 100 includes a controller, e.g., host computer 102, which may couple to one or more instruments. The host computer 102 may include a CPU, a display screen, memory, and one or more input devices such as a mouse or keyboard as shown. In some embodiments, the computer system 102 may include the computer system 82 or the computer system 90 and may specify operation of the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

A serial instrument (not shown) may also be coupled to the computer 102 through a serial port, such as an RS-232 port, USB (Universal Serial bus) or IEEE 1394 or 1394.2 bus, provided by the computer 102.

FIG. 2B illustrates an exemplary automation system 160 which may be specified or documented according to various embodiments of the invention. The automation system 160 is similar to the instrumentation or test and measurement system 100 shown in FIG. 2A. Elements which are similar or identical to elements in FIG. 2A have the same reference numerals for convenience. The system 160 may include a controller, e.g., the computer 102, which couples to one or more devices or instruments. The computer 102 may include a CPU, a display screen, memory, and one or more input devices such as a mouse or keyboard as shown. The computer 102 may operate with the one or more devices to a process or device 150 to perform an automation function, such as MMI (Man Machine Interface), process control, advanced analysis, or other control, among others.

The one or more devices may include a data acquisition board 114 and associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 2A and 2B above, one or more of the various devices may couple to each other over a network, such as the Internet. In one embodiment, the user may select one or more target devices from a plurality of possible devices for specification and/or documentation using a program.

Figure 3:
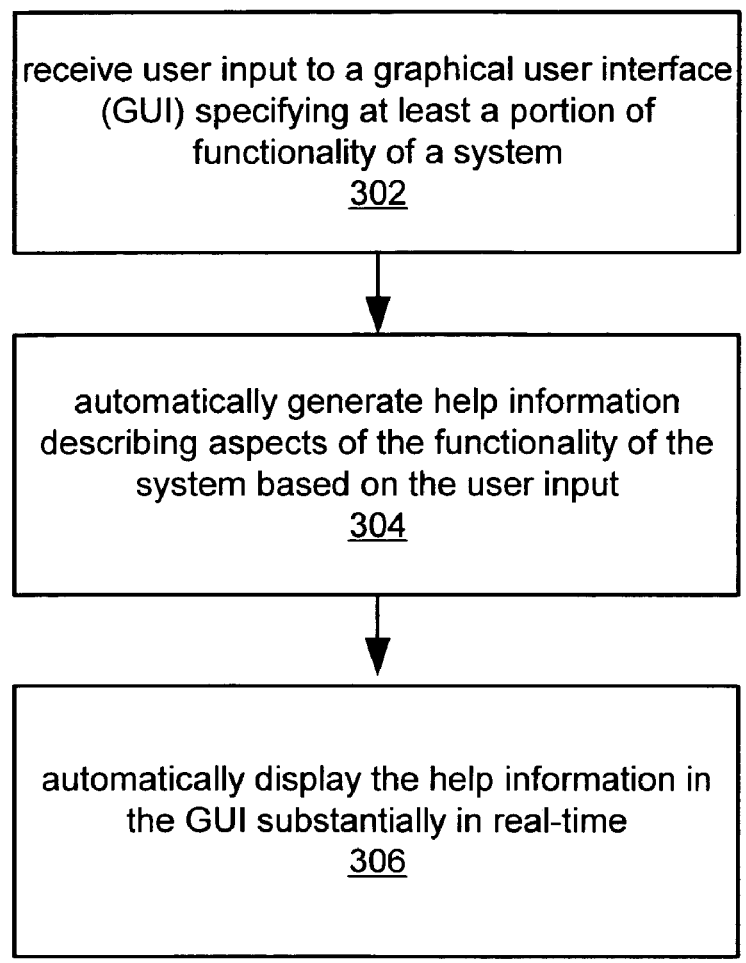
FIG. 3 is a flowchart diagram illustrating a method for automatically generating help information based on user input, according to one embodiment of the present invention.

FIG. 3—Method for Automatically Generating Help Information

FIG. 3 illustrates a method for automatically generating help information in response to user input, according to some embodiments. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, user input may be received to a graphical user interface (GUI) specifying at least a portion of functionality of a system. The input may be received via various methods, e.g., via a keyboard or mouse coupled to a computer system executing the GUI, e.g., the computer system 82 and/or the computer system 90, among others, via voice recognition software, e.g., via a microphone, and/or other methods for user input.

In one embodiment, the user input may specify various types of functionalities, e.g., measurement, automation, control, and/or testing functionality. For example, the user may specify a portion of functionality of a simple system that includes a software routine and associated digitizer board for acquiring and manipulating analog data. Note that the above listed functionalities are exemplary only, and in fact, other applications are envisioned, such as, for example, specification of industrial and/or measurement functions, specification of attributes of the functionality of the system, and specification of various other systems and appliances, e.g., consumer electronics, home appliances, computer systems, sound systems, printers, and others. In some embodiments, the user input may specify functionality and/or behavior of a plurality of components, e.g., software component(s), local and/or remote hardware component(s), e.g., device(s), etc., for performing at least the portion of the functionality of the system, e.g., at a component level. In one embodiment the software components may include one or more graphical program(s) and/or text-based program(s). The hardware device(s) may include one or more pluggable module(s) insertable into a chassis, and/or device(s), e.g., measurement device(s), automation device(s), testing device(s), simulation device(s), consumer electronic device(s), e.g., in a home appliance or consumer electronic system, and/or other suitable device(s), e.g., such as those described above with regard to FIGS. 2A and 2B, among others. As an example, the user may specify a portion of functionality of a complex system, e.g., a motion control system, which may include several analog and digital I/O modules, an FPGA with associated code to drive the modules, and/or a controller with associated software to control the FPGA.

In some embodiments, the GUI may be or include a wizard, where, for example, the user may be led through specification of a system. In one embodiment, the wizard may receive user input via a series of input windows, e.g., in the GUI, which may allow the user to specify portions of functionality of the system in a logical manner, e.g., from lower-level functionality to higher-level functionality. One example of such a wizard, e.g., an application assistant, is described in U.S. patent application Ser. No. 10/128,843, which was incorporated by reference above.

In 304, help information describing one or more aspects of the functionality of the system may be automatically generated based on the user input. In one embodiment, at least one of the one or more aspects of the functionality of the system may be at a system level, e.g., the help information may describe higher-level attributes of the system rather than just information that is specific to the portion of functionality specified by the user, e.g., components, functions, etc. For example, the user may specify a series of data acquisition boards in a system that are interdependent, that is, they must interact with each other for data acquisition. In such an example, the system may provide system information regarding the maximum working rate for the entire system based on the slowest data acquisition board of the series. Thus, the system may provide higher-level information, e.g., the maximum rate of acquisition for the system, rather than component-level information, e.g., rates associated with each of data acquisition boards. Further examples of these system level aspects will be described in more detail below.

In some embodiments, if the user has specified a plurality of components, automatically generating the help information may include retrieving information regarding the plurality of components and subsequently generating the help information based on that retrieved information. In one embodiment, the information may be retrieved from one or more digital files, e.g., XML files, which may include information regarding multiple components, a subset of which may be the plurality of components. In other words, the digital files may include information regarding a plethora of components, some or all of which may be the specified plurality of components. Alternatively, or additionally, the information may be similarly retrieved from one or more databases. In one embodiment, the databases may include information regarding a plurality of devices, and as with the components, a subset of these may be the one or more devices specified by the user. The databases and/or digital files may be organized in a hierarchical structure, e.g., there may be a master database and/or digital file which may indicate one or more other databases and/or digital files which may include information regarding classes of devices and/or components. These databases, and/or digital files, may in turn indicate other database(s) or digital file(s), or may contain the information regarding the component(s) and/or device(s) specified by the user. Note that the above-described organization is exemplary only, and that other organizations are envisioned.

In some embodiments, retrieving the information may also include polling, i.e., querying, one or more attached hardware devices, such as those devices described above, among others. In one embodiment, the attached hardware devices may be simulated, e.g., the GUI may emulate their presence using virtual devices. In this case, polling the hardware devices may include polling the virtual devices for information, which may return information using similar methods as those described above.

For example, when polled, a virtual device, e.g., via the GUI, may respond to the poll as if it were an actual device. In one embodiment, the virtual device may include or retrieve information from an electronic data sheet (EDS), which may describe various aspects of the actual device, e.g., the device type, configurable parameters, etc. Alternatively, or additionally, the virtual device may include or retrieve information from one or more other files and/or databases. In one embodiment, the files or databases may be queried with information regarding the received poll and may subsequently return information appropriate to the poll. For example, the files or databases may include a table describing various attributes, e.g., response time, power consumption, etc., of the actual device, e.g., a data acquisition board. More specifically, the GUI may poll the virtual device, e.g., for response time or power consumption, and the virtual device may then retrieve information from a file and/or database regarding these features of the actual device. Subsequently, the virtual device may respond to the poll with the appropriate information, i.e., from the information retrieved from the file and/or database. Thus, the virtual devices may interact with the GUI as if they were real devices.

In some embodiments, automatically generating the help information may include synthesizing or calculating one or more system level attributes of the system based on the information regarding the plurality of components and/or the user input. More specifically, when the user specifies one or more functions (e.g., industrial, measurement, automation, etc.), components (e.g., software components and/or hardware devices), and/or other attributes of the functionality of the system, the help information may include information regarding the combination of and/or the interaction between one or more of the specified attributes, functions, and/or components, among others. For example, following the example described above regarding the series of data acquisition boards, the maximum rate of acquisition may be calculated from the component level information, e.g., the respective rates of each of the data acquisition board, retrieved from the various sources enumerated above, among others.

As another example, a user may specify one or more hardware devices in a system, e.g., two data acquisition boards included in a chassis. In this situation, the GUI may retrieve information regarding the two data acquisition boards and calculate a system-level aspect based on the component-level information retrieved. As a more specific example, if the first data acquisition board consumes 1.2 watts, the second data acquisition board consumes 1.7 watts, and the chassis, e.g., the backplane of the chassis, consumes 3.2 watts, instead of simply generating help information listing these three component-level power consumptions, the help information may describe a system-level power consumption, in this case, 6.1 watts. Note that the above example and calculation is exemplary only, and other examples and calculations are envisioned; for example, the power consumption may not be a simple addition, but may be calculated via various simple or complex functions depending on the design of the system. Note, however, that in some embodiments, the help information may also include descriptions of component-level aspects of each individual component. FIGS. 4-8, described in more detail below, provide further examples of specified functionality and respective automatically generated help information.

In 306, the help information may be automatically displayed in the GUI substantially in real time. In some embodiments, the help information may be displayed in a window of the GUI as text. Alternatively, or additionally, the help information may be graphical, e.g., the help information may include a graphical depiction of at least a subset of the system displayed in one or more windows of the GUI. Exemplary illustrations of the help information will be described below with regard to FIGS. 4-8.

In some embodiments, the method may also include receiving further user input specifying modification and/or addition of a portion of functionality of the system. Similar to above, the modification and/or addition may be performed via various techniques, e.g., by entering (or re-entering) input specifying the modification and/or addition, e.g., via a keyboard, or by addition to and/or modification of the depictions of the system, e.g., by graphically editing the pictorial help information, e.g., via dragging and dropping with a mouse. Subsequently, similar to above, the help information may be automatically updated and displayed based on the new user input. Moreover, performing said receiving user input (302 and/or the modification described above), automatically generating/updating help information (304), and automatically displaying the help information (306) one or more times may specify the functionality of the system.

Figure 4:
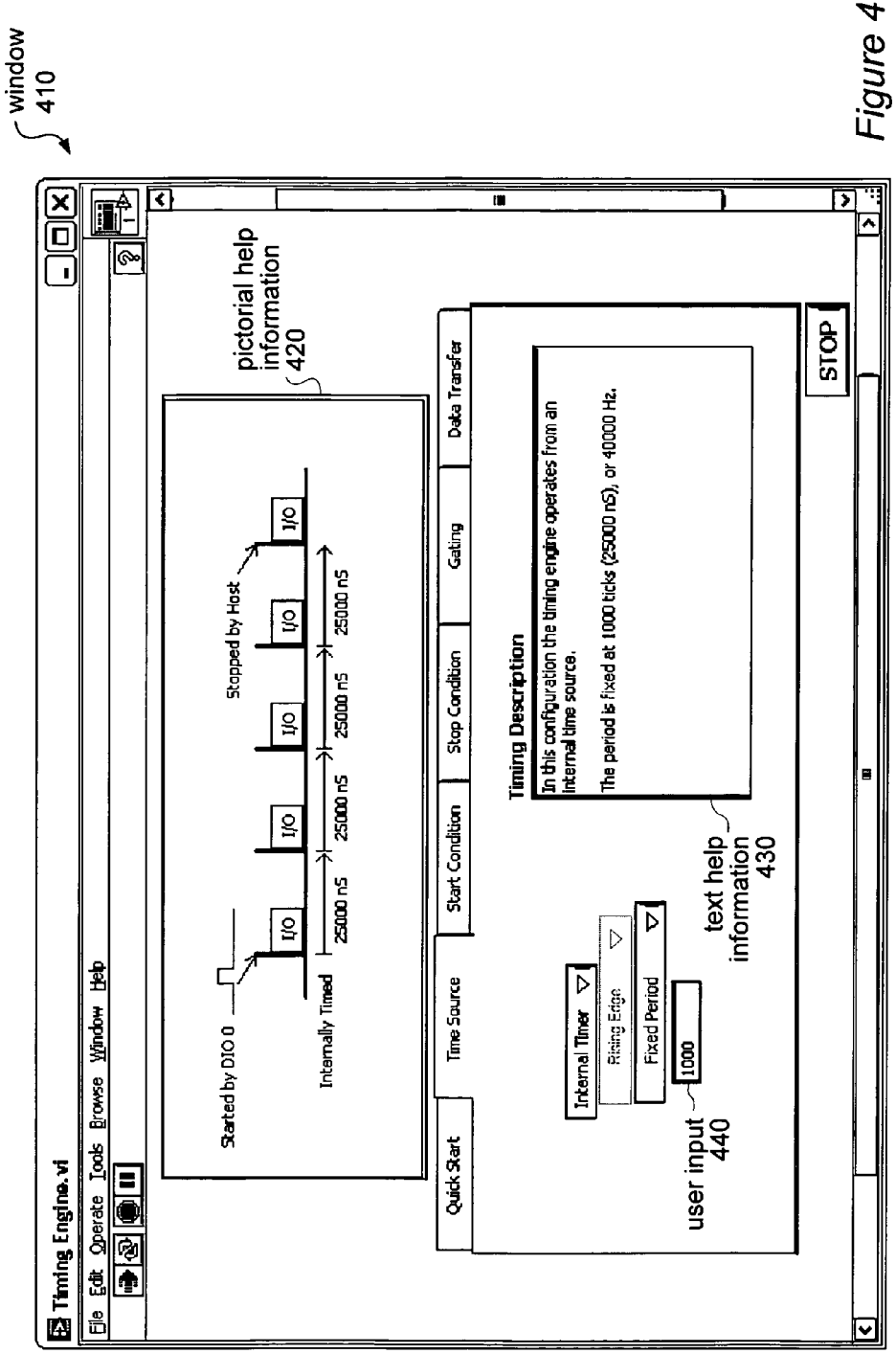
FIGS. 4-6 illustrate exemplary timing specifications and respective help information, according to some embodiments of the invention.
Figure 5:
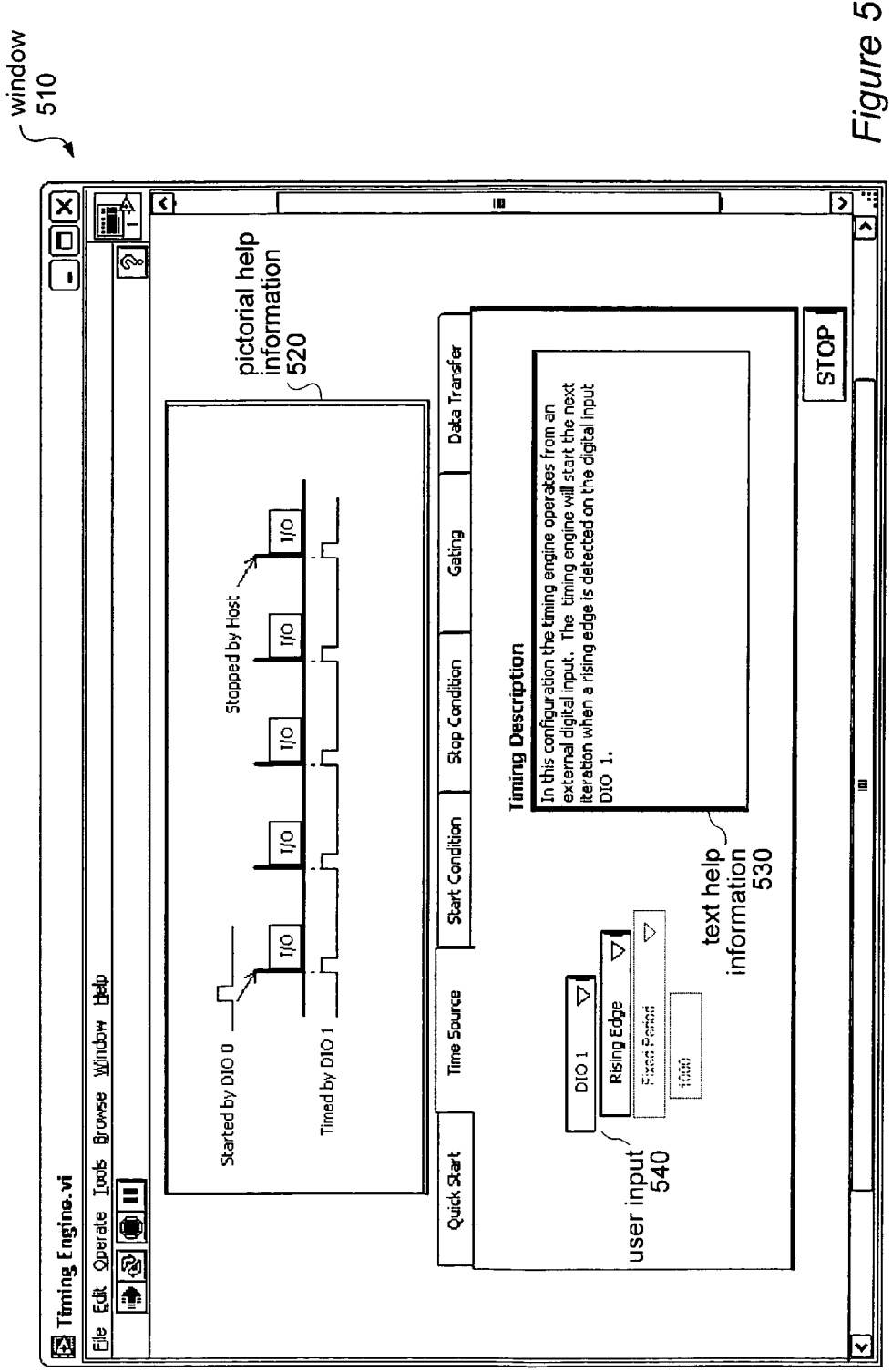
Figure 6:
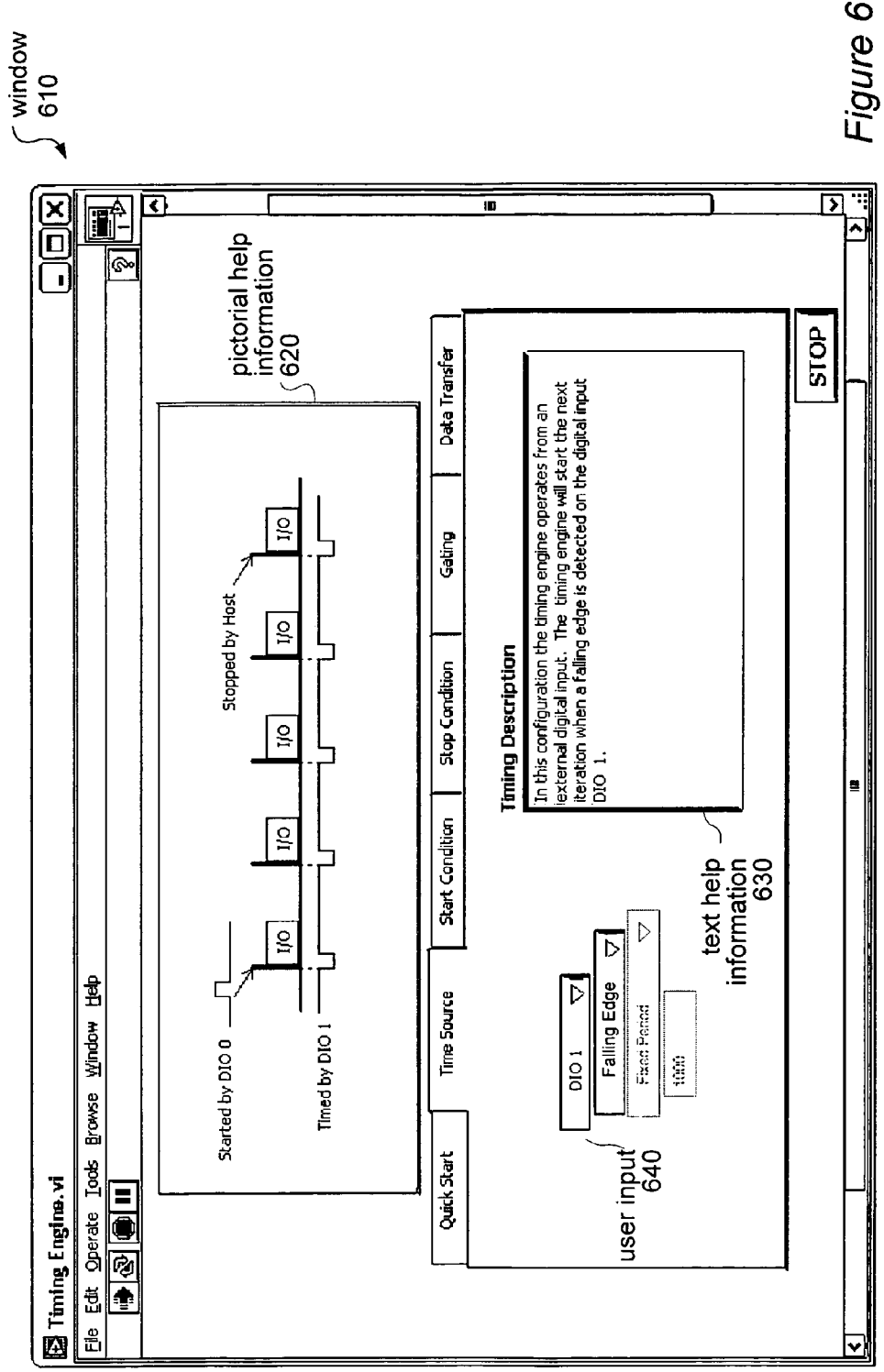

FIGS. 4-6—Exemplary Timing Specifications and Respective Help Information

FIGS. 4-6 illustrate exemplary timing specifications with respective help information. As described above, a user may specify various aspects or functionalities of the system via a GUI. As illustrated in FIG. 4, in one embodiment, the user may specify the timing of the system as illustrated in window 410 by user input 440. In this example, the user specifies an internal timing source which occurs on a fixed period, e.g., every 1,000 units, in this case 'ticks'. Correspondingly, as also described above, the GUI may display text and pictorial help information, e.g., text help information 430 and pictorial help information 420. In this example, the text help information 430 describes the timing of the system, e.g., that the configuration of the timing engine operates from an internal timing source and the period of the timing source is 1,000 ticks. Note that the system has also provided additional information derived from the user input regarding the period; more specifically, the text help information also describes the period in terms of seconds, e.g., 1,000 ticks corresponds to 25,000 ns, and in terms of hertz, e.g., 1,000 ticks corresponds to 40,000 Hz. In other words, based on the choices made by the user, e.g., the internal timer and the 1,000 ticks, the system may retrieve information from various sources, e.g., digital files and/or databases, and calculate the corresponding seconds and hertz values, e.g., 25,000 ns and 40,000 Hz respectively. In this example, the pictorial help information 420 similarly describes the results of the user's specified functionality. The pictorial help information 420, similar to the text help information, describes the timing diagram as internally timed and labels the 1,000 ticks in seconds, e.g., 25,000 ns. Note that the pictorial help information 420 also describes other system aspects which may have been specified earlier, e.g., the start condition, e.g., by DIO 0, and the stop condition, e.g., by the host.

Similarly, in FIG. 5, as illustrated in user input 540, the user may choose a digital I/O board as the timing source, which may drive the timing according to the rising edge received from the digital I/O board, e.g., in this case, from DIO 1. As described above, the GUI may display the help information via text and pictorial help information 530 and 520. In this case, the help information describes that the timing configuration operates from an external digital input, and will start the next iteration on the rising edge of DIO 1. Said another way, the timing of the system may be driven by each rising edge received from DIO 1. This help information may also be displayed graphically, e.g., as in pictorial help information 520 inside of window 510. Alternatively, in FIG. 6, the user may choose, e.g., in user input 640, to drive the timing on the falling edge of DIO 1, and the help information may be correspondingly displayed in text and pictorial help information 630 and 620 inside of window 610.

Figure 7:
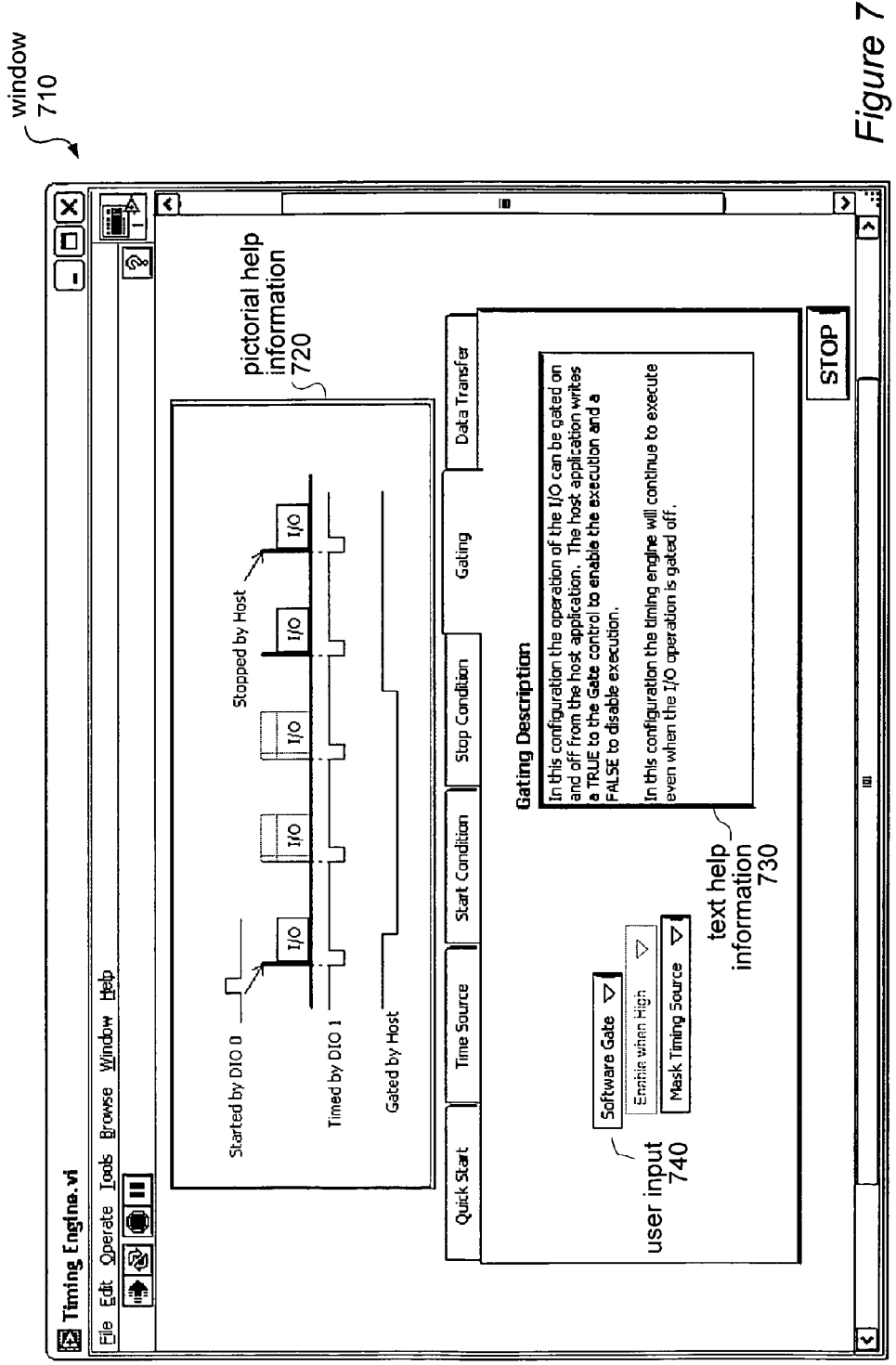
FIGS. 7 and 8 illustrate exemplary gating specifications and respective help information, according to some embodiments of the invention.
Figure 8:
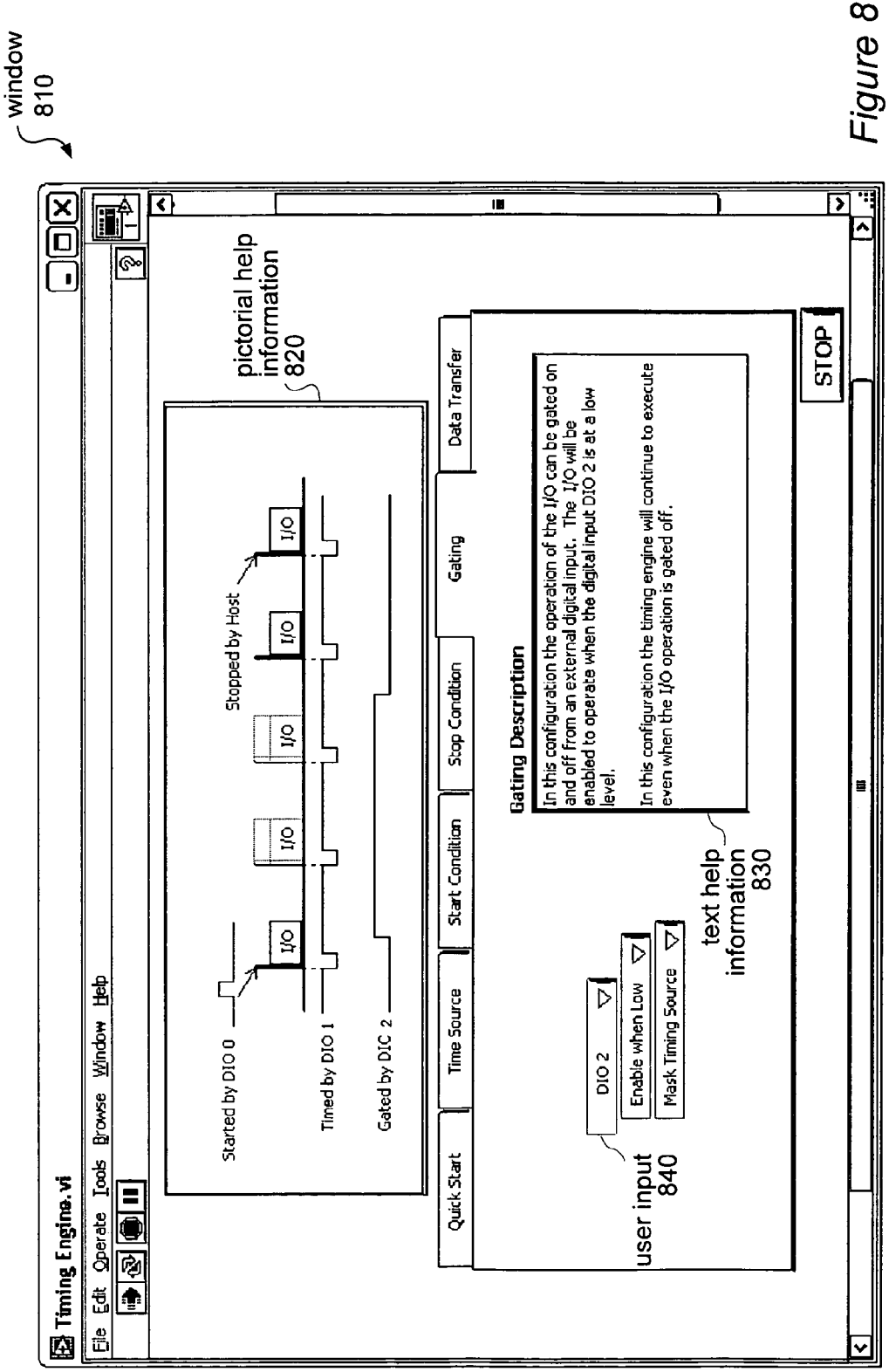

FIGS. 7 and 8—Exemplary Gating Specifications and Respective Help Information FIGS. 7 and 8 illustrate exemplary gating specifications provided by the user, and corresponding help information. As FIG. 7 shows, the user may specify gating of the system via user input 740, as may be seen in window 710. In this example, the user may specify a software gate as well as functionality for masking the timing source. Consequently, text-based help information may be presented that describes the resulting system; for example, text help information 730 recites:

In this configuration the operation of the I/O can be gated on and off from the host application. The host application writes a TRUE to the Gate control to enable the execution and a FALSE to disable execution.

In this configuration the timing engine will continue to execute even when the I/O operation is gated off.

Similarly, pictorial help information 720 describes the results of the specified gating; in this case the pictorial information shows the I/O blocks as shaded in sections when the I/O is gated off. The pictorial information also illustrates that the timing engine continues to execute while this gating occurs, and additionally, describes the start and stop conditions of the system.

Finally, as shown in FIG. 8, the user may specify gating of the system, e.g., via user input 840, by enabling I/O on the low level of an external digital input, e.g., DIO 2. In this case, the I/O is enabled while the DIO 2 signal is low, or off, and is disabled while the DIO 2 signal is high, or on. Similar to the example illustrated in FIG. 7, text and pictorial help information 830 and 820, displayed in window 810, may accurately depict the system behavior according to the user's input of component-level attributes.

Thus, various embodiments of the present invention may automatically generate and display help information based on user specification of at least a portion of functionality of a system.

Figure 9:
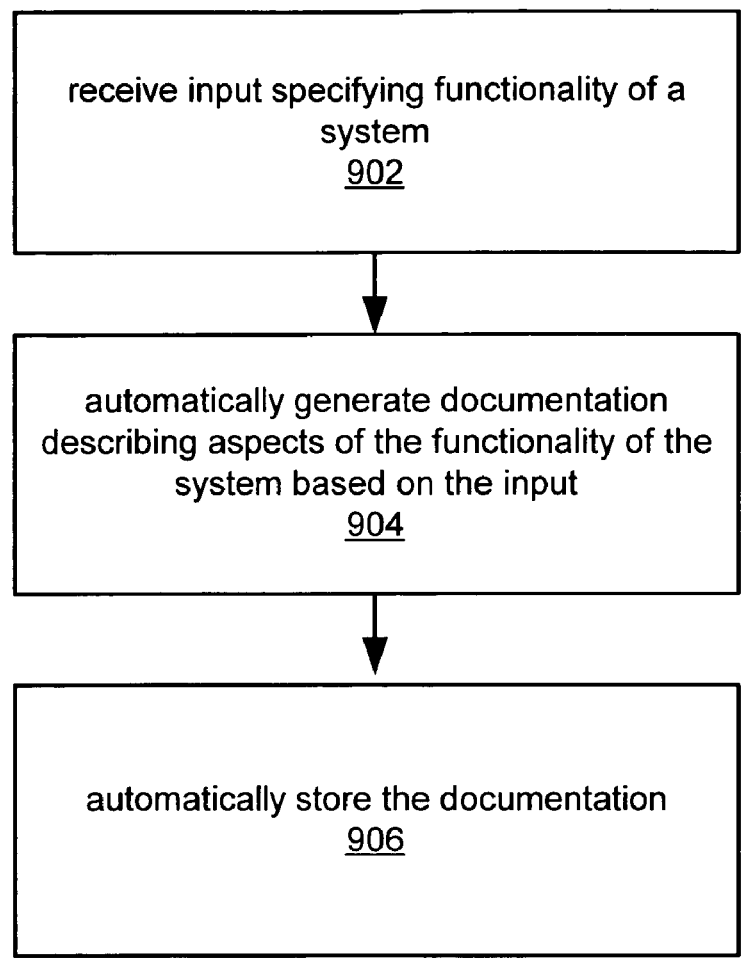
FIG. 9 is a flowchart diagram illustrating a method for automatically generating documentation based on input, according to one embodiment of the present invention.

FIG. 9—Method for Automatically Generating Documentation Based on Input

FIG. 9 illustrates a method for automatically generating documentation based on input, according to some embodiments. The method shown in FIG. 9 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 902, input specifying functionality of a system may be received. In some embodiments, the functionality may be specified via the iterative method described above regarding FIG. 3. For example, similar to the examples described above regarding FIG. 4-8, portions of functionality may be specified by the user via multiple windows, e.g., via a wizard included in the GUI, resulting in input specifying the full functionality of the system. Alternatively, or additionally, the input may include other user input and/or digital file(s), among others. In one embodiment, the input may include generated code for controlling/executing the designed system. For example, in one embodiment, the generated code may have already been generated for use in a pre-existing system; alternatively, the generated code may be created by another system used for implementing designs in systems. In one embodiment, the generated code may include one or more text-based and/or graphical programs which may be stored in the memory medium of a computer system, e.g., the computer system 82. The code may be stored in the memory medium of another computer system coupled to the computer system, e.g., the computer system 90, or in some external device coupled to the computer system.

Similar to above, the input may specify a variety of functions, desired behavior, desired functionality, e.g., industrial, measurement, testing, automation, control, etc., components, e.g., hardware devices and software components, e.g., text-based and/or graphical program(s), and other systems, e.g., home theatre systems, consumer electronic systems, etc., among others. As also described above, the input may specify functionality of the system at a component-level, e.g., with regard to how individual components, or subsets of the functionality, of the system operate.

In 904, documentation describing aspects of the functionality of the system may be automatically generated based on the input. In one embodiment, input in the form of digital files, may be automatically analyzed to generate the documentation. For example, generated code, e.g., for controlling a motion system, may be automatically analyzed, and subsequently, may be documented according to that analysis. More specifically, the generated code may be analyzed for component level aspects, e.g., specific functions and functionalities, components, attached devices, etc., as well as other aspects, e.g., system level aspects, user defined aspects, and other suitable aspects. Subsequently, the information garnered from the analysis may be used to automatically generate the documentation. Alternatively, or additionally, when the input is received via the methods described above with regard to FIGS. 3-8, a subset or all of the automatically generated help information, and possibly other information, may be compiled into the documentation.

Similar to above, in some embodiments, information regarding the specified components, attributes, functionalities, etc., may be retrieved from various sources, e.g., one or more digital files, e.g., XML or EDS files, one or more databases with various organizational structures, one or more devices, and/or one or more virtual devices, e.g., for the devices and virtual devices, via polling, among others. Thus, in generating the documentation, the retrieved information, and/or other attributes that are specified by the input, may be used to synthesize or calculate system-level attributes, which may describe high-level aspects of the system, e.g., caused by or related to the interaction between or the combination of the various specified components, functionality, etc.

As one example, input, e.g., user input, may specify a laser welding system, including a four-slot chassis containing a field-programming gate array (FPGA) and a host computer. Additionally, the input may specify three insertable modules for the chassis: a thermocouple input board, an analog input board, and a digital output board. Operation of the system may be specified as follows. The thermocouples may be queried every two seconds and the system may update front panel controls on a GUI; they may also be linked to alarms and may be operable to shut down the system in case of problems, e.g., via the digital output board. The analog input may be used to measure the output from a photodiode/amplifier, which may measure the light intensity from a weld line in the laser welding apparatus. In this case, the analog input may be used in a proportional integral derivative (PID) loop controller with a pulse-width modulated (PWM) output on one of the digital output lines to control the laser weld power. The PID loop rate may be modified "on the fly", i.e., while the program is running, as may the PWM frequency. The minimum PID rate may be set during design of the system, e.g., via the user; however, in this example, the maximum PID rate may not be specified by the user.

After the input specifies this example system, e.g., via the method described above in 902, the documentation may be automatically generated, e.g., as indicated in 904. In one embodiment, the documentation may include information, e.g., retrieved from the thermocouple units, regarding sensitivity, accuracy, drift, and/or other attributes of these units. The documentation may also include the update rate of the temperatures recorded by the thermocouples, e.g., 2 Hz, as specified by the input, and the PWM frequency, e.g., determined by the maximum capabilities of the digital I/O board and the FPGA clock speed, e.g., via information polled from the devices, polled from the virtual devices corresponding to the devices, and/or retrieved from digital file(s), among others. In one embodiment, the documentation may include the PID loop rate ranges, where, for example, the maximum loop rate may be determined by the minimum of the analog acquisition time, the PWM frequency, and the PID algorithm calculation time, and the minimum loop rate may be specified by the user. The documentation may also include a description of the manner in which the PWM/PID may be modified "on the fly".

Thus, the method may receive information from a variety of sources, e.g., the user, devices and/or virtual devices, and/or digital files, among other sources, and compile that information for documenting the system, e.g., via descriptions of system and component level aspects of the system. Note that the above system and documentation is exemplary only, and other systems and documentation are envisioned other than those described herein.

In 906, the documentation may be automatically stored. In some embodiments, the input or further input may specify storage of the documentation in one or more file formats, e.g., one or more generic formats which may be later converted to any of a plurality of specific formats. The one or more file formats may include one or more of eXtensible Markup Language (XML) format, Hyper Text Markup Language (HTML) format, portable document format (pdf), Microsoft Word document format, plain text format, OpenDocument Format (ODF), American Standard Code for Information Interchange (ASCII) format, post script (ps) format, a compression format, a graphical format, and an executable format, among others.

As indicated above, if the documentation is encoded in one or more generic formats, e.g., XML, the method may also include converting the documentation to at least one of the one or more specific formats, e.g., from the file formats listed above, among others. In one embodiment, the user may choose among a variety of destination file format(s), e.g., via the GUI, e.g., via a menu included in the GUI and may invoke the automatic conversion of the documentation. Furthermore, similar to descriptions above regarding FIG. 3, the method may further include receiving input, e.g., user input, modifying at least a portion of functionality of the system. In one embodiment, the method may automatically update the documentation according to the user input and subsequently automatically store the documentation similar to above in 904 and 906, e.g., in one or more file formats, e.g., according to the input or further input.

In some embodiments, the method may also include transmitting the documentation to another memory medium, e.g., to a memory medium included in the computer system 90, and/or another computer system or device. Alternatively, or additionally, the documentation may be printed and/or published, e.g., on a network, e.g., the Internet, for access by various users who may require the documentation.

Exemplary System Specification and Documentation

As an example, received input may specify a system including four hardware modules physically installed in a system, e.g., in a chassis. In one embodiment, using the system and methods described herein, information regarding the specification of the modules may be automatically retrieved, e.g., based on the input and/or by polling the system and/or modules. In this specific case, the following information may be retrieved:

a high speed analog input module having 8 channels and a maximum sampling rate of 200 kHz with 2 bytes per sample;

a thermocouple input module having 4 channels and a maximum sampling rate of 5 Hz with 3 bytes per sample;

a digital input module having an 8 bit port and a maximum sampling rate of 10 MHz with 1 byte per sample;

a digital output module having an 8 bit port and a maximum sampling rate of 1 MHz with 1 byte per sample; and the system having a single point timed I/O module with two choices for data transfer:

DMA based data transfer, i.e., 20 MBytes per second, guaranteed, and interrupt based data transfer, i.e., 1 MByte per second (system dependent).

In this example, the input may also specify a specific configuration for the system and four modules. For example, the input, e.g., from a user, may specify utilization of 3 of the 8 channels for high speed analog input, 8 bit digital input, 8 bit digital output, and DMA based data transfer.

Given this input, i.e., the four modules and system, and corresponding information regarding the input, the retrieved information and configuration information may be compiled and stored in an aggregate section, i.e., a section describing all of the components individually, e.g., similar to the above retrieved information example, included in a document file. Additionally, the documentation may include higher-level aspects of the system; for example, one section, e.g., an overall specification section, may include:

| System Specifications: | |
|---|---|
| Maximum system sampling rate: | 200 kHz, limited by high speed analog input |
| Overall data transfer rate: | 1.6 MBytes per second |
| Resources used: | |
| High speed analog input: | 3 channels at 200 kHz, consuming 1.2 MBytes per second of bandwidth |
| Digital input: | 8 bit port at 200 kHz, consuming 200 kBytes per second of bandwidth |
| Digital output: | 8 bit port at 200 kHz, consuming 200 kBytes per second of bandwidth |

Thus, as described above, the documentation may include system-level aspects that are calculated from the input specifying the system and information retrieved regarding the individual components, e.g., from this example: a maximum sampling rate of 200 kHz, an overall data transfer rate of 1.6 MBytes per second, and the resulting individual rates for the analog and digital inputs and digital output.

As described above, further input, e.g., from a user, may also modify the specification of the system, e.g., after documentation has been automatically generated. For example, following the example above, a user may change the data transfer method to interrupt based data transfer. In this case, the documentation may be automatically regenerated according to the new specification, and subsequently stored, e.g., in a format specified by the input and/or the further input. Thus, the aggregate section may be changed to reflect the new data transfer rate, and the overall specification section may include:

| System Specifications: | |
|---|---|
| Maximum system sampling rate: | 125 kHz typical, system dependent, limited by interrupt based data transfer. |
| Overall data transfer rate: | 1 MByte/second |
| Resources used: | |
| High speed analog input: | 3 channels at 125 kHz, consuming 750 kBytes/second of bandwidth |
| Digital input: | 8 bit port at 125 kHz, consuming 125 kBytes/second of bandwidth |
| Digital output: | 8 bit port at 125 kHz, consuming 125 kBytes/second of bandwidth |

Thus, the updated documentation may include updated system-level aspects, i.e., as calculated from the input and retrieved information regarding the specified components. More specifically, the maximum system sampling rate has changed to 125 kHz, with the caveat that this is system dependent, the overall data transfer rate has changed to 1 MByte per second, and the individual rates have changed correspondingly.

Note that the above described system specifications and documentations (and format thereof) are exemplary only, and other specifications, documentations, and formats are envisioned.

Thus, various embodiments of the present invention may automatically generate and store documentation based on input specifying functionality of a system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium that stores program instructions for automatically generating documentation, wherein the program instructions are executable to:

receive input specifying functionality of a measurement system, wherein said receiving input specifying the functionality of the measurement system comprises receiving input specifying a plurality of devices of the measurement system, wherein the plurality of devices comprise a first device and a second device, wherein the input defines a specified measurement system;

automatically generate documentation based on the specified measurement system, wherein the documentation comprises human readable text presented in a human language, wherein the documentation describes one or more aspects of the functionality of the specified measurement system, wherein at least one of the one or more aspects of the functionality of the specified measurement system is a system level aspect which comprises information regarding a combination of and/or interaction between the first device and the second device in the specified measurement system, wherein the system level aspect comprises human readable text presented in a human language, wherein the system level aspect comprises at least one of a maximum sampling rate of the measurement system or an overall data transfer rate of the measurement system; and store the documentation.

2. The memory medium of claim 1,
wherein the documentation includes one or more timing diagrams which visually specify timing of the measurement system.

3. The memory medium of claim 1,
wherein the input specifies functionality of the plurality of devices of the measurement system at a device level.

4. The memory medium of claim 1,
wherein the input specifies one or more software components of the measurement system.

5. The memory medium of claim 4,
wherein a first aspect of the one or more aspects comprises information regarding a combination of and/or interaction between the one or more software components with other components of the measurement system.

6. The memory medium of claim 4,
wherein the one or more software components comprise at least one graphical program, wherein the graphical program comprises a plurality of interconnected nodes that visually indicate functionality of the at least one graphical program.

7. The memory medium of claim 1, wherein said automatically generating documentation based on the input comprises:
automatically retrieving information regarding the plurality of devices; and
automatically generating documentation based on the retrieved information.

8. The memory medium of claim 7, wherein said automatically generating documentation further comprises:
calculating the at least one system level aspect based on the information regarding the plurality of devices.

9. The memory medium of claim 1,
wherein the input specifies desired behavior of the plurality of devices.

10. The memory medium of claim 1, wherein the program instructions are further executable to:
display a graphical user interface (GUI) for specifying the measurement system;
wherein said receiving input comprises receiving user input to the GUI.

11. The memory medium of claim 1, wherein the program instructions are further executable to:
receive user input modifying the at least a portion of functionality of the measurement system; and
automatically update the documentation based on the user input.

12. The memory medium of claim 1,
wherein said automatically storing the documentation comprises automatically storing the documentation encoded in one or more generic formats convertible to any of a plurality of specific formats.

13. A method for automatically generating documentation, comprising:
receiving input specifying functionality of a measurement system, wherein said receiving input specifying the functionality of the measurement system comprises receiving input specifying a plurality of devices of the measurement system, wherein the plurality of devices comprise a first device and a second device, wherein the input defines a specified measurement system;
automatically generating documentation based on the specified measurement system, wherein the documentation comprises human readable text presented in a human language, wherein the documentation describes one or more aspects of the functionality of the specified measurement system, wherein at least one of the one or more aspects of the functionality of the specified measurement system is a system level aspect which comprises information regarding a combination of and/or interaction between the first device and the second device in the specified measurement system, wherein the system level aspect comprises human readable text presented in a human language, wherein the system level aspect comprises at least one of a maximum sampling rate of the measurement system or an overall data transfer rate of the measurement system; and
storing the documentation.

14. The method of claim 13,
wherein the documentation includes one or more timing diagrams which visually specify timing of the measurement system.

15. The method of claim 13,
wherein the input specifies functionality of the plurality of devices of the measurement system at a device level.

16. The method of claim 13,
wherein the input specifies one or more software components of the measurement system.

17. The method of claim 16,
wherein a first aspect of the one or more aspects comprises information regarding a combination of and/or interaction between the one or more software components with other components of the measurement system.

18. The method of claim 16,
wherein the one or more software components comprise at least one graphical program, wherein the graphical program comprises a plurality of interconnected nodes that visually indicate functionality of the at least one graphical program.

19. The method of claim 13, further comprising:
displaying a graphical user interface (GUI) for specifying the measurement system;
wherein said receiving input comprises receiving user input to the GUI.

20. The method of claim 13, further comprising:
receiving user input modifying the at least a portion of functionality of the measurement system; and
automatically updating the documentation based on the user input.

21. A system for automatically generating documentation, comprising:
a processor; and
a memory medium coupled to the processor, wherein the memory medium stores program instructions, wherein the program instructions are executable by the processor to:
receive input specifying functionality of a measurement system, wherein said receiving input specifying the functionality of the measurement system comprises receiving input specifying a plurality of devices of the measurement system, wherein the plurality of devices comprise a first device and a second device, wherein the input defines a specified measurement system;
automatically generate documentation based on the specified measurement system, wherein the documentation comprises human readable text presented in a human language, wherein the documentation describes one or more aspects of the functionality of the specified measurement system, wherein at least one of the one or more aspects of the functionality of the specified measurement system is a system level aspect which comprises information regarding a combination of and/or interaction between the first device and the second device in the specified measurement system, wherein the system level aspect comprises human readable text presented in a human language, wherein the system level aspect comprises at least one of a maximum sampling rate of the measurement system or an overall data transfer rate of the measurement system; and
store the documentation.

22. The system of claim 21,
wherein the documentation includes one or more timing diagrams which visually specify timing of the measurement system.

23. The system of claim 21,
wherein the input specifies functionality of the plurality of devices of the measurement system at a device level.

24. The system of claim 21,
wherein the input specifies one or more software components of the measurement system.

25. The system of claim 24,
wherein a first aspect of the one or more aspects comprises information regarding a combination of and/or interaction between the one or more software components with other components of the measurement system.

26. A computer-accessible memory medium that stores program instructions for automatically generating documentation, wherein the program instructions are executable to:
receive input specifying functionality of a measurement system, wherein said receiving input specifying the functionality of the measurement system comprises receiving input specifying a plurality of hardware components of the measurement system, wherein the plurality of devices comprise a first hardware component and a second hardware component, wherein the input defines a specified measurement system;
automatically generate documentation based on the specified measurement system, wherein the documentation comprises human readable text presented in a human language, wherein the documentation describes one or more aspects of the functionality of the specified measurement system, wherein at least one of the one or more aspects of the functionality of the specified measurement system is a system level aspect which comprises information regarding a combination of and/or interaction between the first hardware component and the second hardware component in the specified measurement system, wherein the system level aspect comprises human readable text presented in a human language, wherein the system level aspect comprises at least one of a maximum sampling rate of the measurement system or an overall data transfer rate of the measurement system; and
store the documentation.

27. The memory medium of claim 26,
wherein the documentation includes one or more timing diagrams which visually specify timing of the measurement system.

28. The memory medium of claim 26,
wherein the input specifies functionality of the plurality of hardware components of the measurement system at a device level.

29. The memory medium of claim 26,
wherein the input specifies one or more software components of the measurement system.

30. The memory medium of claim 29,
wherein a first aspect of the one or more aspects comprises information regarding a combination of and/or interaction between the one or more software components with other components of the measurement system.

31. The memory medium of claim 29,
wherein the one or more software components comprise at least one graphical program, wherein the graphical program comprises a plurality of interconnected nodes that visually indicate functionality of the at least one graphical program.

32. The memory medium of claim 26, wherein said automatically generating documentation based on the input comprises:
automatically retrieving information regarding the plurality of hardware components; and
automatically generating documentation based on the retrieved information.

33. The memory medium of claim 26, wherein the program instructions are further executable to:
display a graphical user interface (GUI) for specifying the measurement system;
wherein said receiving input comprises receiving user input to the GUI.

34. The memory medium of claim 26, wherein the program instructions are further executable to:
receive user input modifying the at least a portion of functionality of the measurement system; and
automatically update the documentation based on the user input.

35. The memory medium of claim 1, wherein at least one of the one or more aspects of the functionality of the measurement system is a maximum rate of data acquisition.

36. The memory medium of claim 1, wherein at least one of the one or more aspects of the functionality of the measurement system is system-level power consumption.

37. The memory medium of claim 1, wherein at least one of the one or more aspects of the functionality of the measurement system describes timing of the system.

* * * * *